United States Patent [19]

Froome et al.

[11] 4,068,951
[45] Jan. 17, 1978

[54] DISTANCE MEASURING APPARATUS

[75] Inventors: Keith Davy Froome; George Russell, both of Teddington, England

[73] Assignee: National Research Development Corporation, England

[21] Appl. No.: 680,850

[22] Filed: Apr. 27, 1976

[30] Foreign Application Priority Data

May 7, 1975 United Kingdom ............... 19218/75

[51] Int. Cl.² ............................................. G01C 3/08
[52] U.S. Cl. ...................................... 356/5; 343/12 R
[58] Field of Search .......................... 356/5; 343/12 R

[56] References Cited

U.S. PATENT DOCUMENTS

| 3,305,861 | 2/1967 | Webb | 343/12 R |
|---|---|---|---|
| 3,521,956 | 7/1970 | Froome et al. | 356/5 |
| 3,547,539 | 12/1970 | Froome et al. | 356/5 |
| 3,573,463 | 4/1971 | Goodwin et al. | 250/199 |
| 3,600,090 | 8/1971 | Wood et al. | 356/5 |
| 3,701,151 | 10/1972 | Sato et al. | 343/12 R |

Primary Examiner—S. C. Buczinski
Attorney, Agent, or Firm—Larson, Taylor and Hinds

[57] ABSTRACT

A distance measuring apparatus comprises a first modulating cavity for modulating a first electromagnetic carrier radiation, the modulated first electromagnetic carrier radiation being transmitted over a path the length of which is to be measured and received by a second modulating cavity which determines the modulation phase thereof. The second modulating cavity also modulates a second electromagnetic carrier radiation in accordance with the modulation phase of the received modulated first electromagnetic carrier radiation and transmits the modulated second electromagnetic carrier radiation back over the path the length of which is to be measured. The first modulating cavity detects the modulation phase of the received modulated second electromagnetic carrier radiation and produces therefrom an indication of the length of the path.

10 Claims, 4 Drawing Figures

DISTANCE MEASURING APPARATUS

This invention relates to distance measuring apparatus.

According to the present invention, there is provided a distance measuring apparatus comprising: first modulating means for modulating a first electromagnetic carrier radiation, first transmitting means for transmitting the modulated first electromagnetic carrier radiation over a path the length of which is to be measured, receiving means for receiving the modulated first electromagnetic carrier radiation and determining the modulation phase thereof, second modulating means for modulating a second electromagnetic carrier radiation in accordance with the modulation phase of the received modulated first electromagnetic carrier radiation, second transmitting means for transmitting the modulated second electromagnetic carrier radiation back over the path the length of which is to be measured, and detecting means for detecting the modulation phase of the received modulated second electromagnetic carrier radiation and producing therefrom an indication of the length of the path.

Said first modulating means may comprise a crystal which exhibits the direct Pockels linear electro-optic effect and which is arranged in a cavity resonator for transmission therethrough, in a direction parrallel to its z-axis, of the first electromagnetic carrier radiation, the x- or y-axis of the crystal being parallel to the plane of polarisation of the first electromagnetic carrier radiation passing therethrough. This is the case where the crystal is, for example, lithium niobate. However, if the crystal is, for example, potassium dihydrogen phosphate or lithium tantalate the orientation of the crystal will be different.

The detecting means may comprise a crystal which exhibits the direct Pockels linear electro-optic effect and which preferably is arranged in the cavity resonator for transmission therethrough in a direction parallel to its optic axis of the received modulated second electromagnetic carrier radiation, the x- or y-axis of the crystal being parallel to the plane of polarisation of the received modulated second electromagnetic carrier radiation and perpendicular to an applied electric field, the apparatus further including means for changing the modulation wavelength and/or the path transversed by the modulated first electromagnetic carrier radiation so as to permit measurement of the path in terms of the modulation wavelength.

The z-axis of each crystal is preferably perpendicular to the electric field at the respective crystal. Again this is the case where each crystal is, for example, lithium niobate. If the crystal is, for example, potassium dihydrogen phosphate or lithium tantalate the orientation of each crystal will be different.

The apparatus may include a first laser for producing the first electromagnetic carrier radiation.

In the preferred embodiment said second modulating means comprises a crystal which exhibits the direct Pockels linear electro-optic effect and which is arranged in a cavity resonator for transmission therethrough, in a direction parallel to its z-axis of the second electromagnetic carrier radiation, the x- or y-axis of the crystal being parallel to the plane of polarisation of the second electromagnetic carrier radiation passing therethrough. The receiving means may include a crystal which exhibits the direct Pockels linear electro-optic effect and which is arranged in the cavity resonator for transmission therethrough in a direction parallel to its optic-axis, of the received modulated first electromagnetic carrier radiation, the x- or y-axis of the crystal being parallel to the plane of polarisation of the received modulated first electromagnetic carrier radiation passing therethrough.

The z-axis of each crystal is preferably perpendicular to the electric field at the respective crystal.

Optionally, but desirably, the first modulating means is arranged to modulate the first electromagnetic carrier radiation at a different frequency from that at which the second modulating means is arranged to modulate the second electromagnetic carrier radiation, the apparatus including photodetecting means arranged to receive radiation from the second modulating means to produce an electric signal the frequency of which is related to the difference between the frequency of modulaton of the first modulating means and the frequency of modulation of the second modulating means and which is amplitude modulated at a frequency whose phase is related to the modulation phase of the received modulated first electromagnetic carrier radiation.

The apparatus may include a second laser for producing the second electromagnetic carrier radiation. The second laser may be arranged to be controlled by the said electrical signal.

The invention is illustrated, merely by way of example, in the accompanying drawings, in which.

Figure 1:
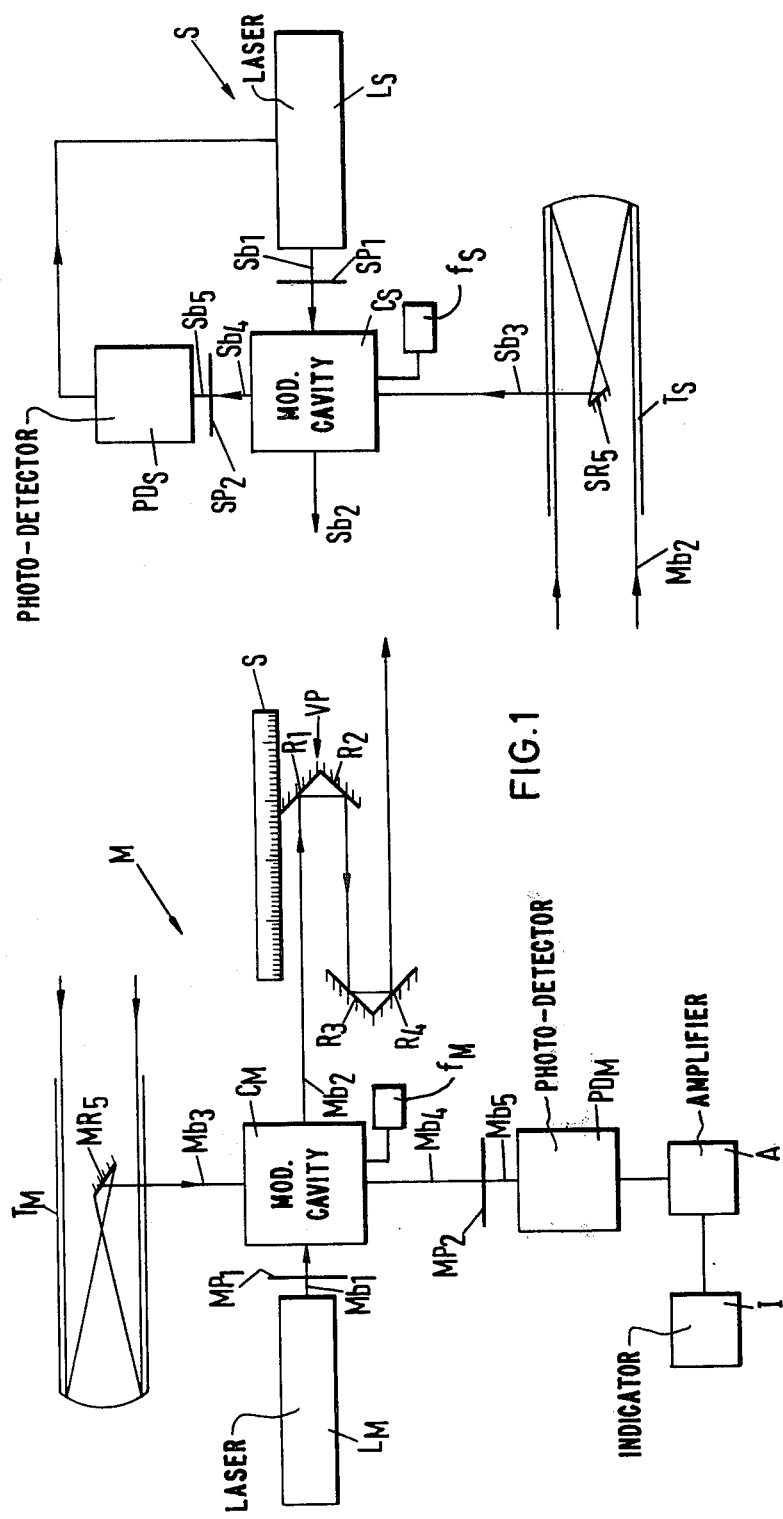
FIG. 1 is a schematic diagram of a distance measuring apparatus according to the present invention.

Referring first to FIG. 1, there is shown a distance measuring apparatus according to the present invention having a master unit M consisting of a laser $L_M$ which provides a coherent, parallel light beam $Mb_1$. The beam $Mb_1$ is directed through a plane polariser $MP_1$ and then through a modulating cavity $C_M$ arranged, in a manner to be described, to produce polarisation modulation of an outgoing beam $MB_2$ and including an associated oscillator which produces an input frequency $f_M$, as illustrated.

The beam $Mb_2$ is directed into a variable light path device VP which may be of any convenient known construction and, in the example illustrated, consists of a first pair of reflectors $R_1$, $R_2$ arranged at right-angles to each other and each inclined at 45° to the beam $Mb_2$ and second pair of reflectors $R_3$, $R_4$, spaced apart from the first pair of reflectors, and arranged at right-angles to each other and each inclined at 45° to the beam $Mb_2$ reflected by the reflector $R_2$. The pair of reflectors $R_1$, $R_2$ are mounted for linear movement in the direction of the beam $Mb_2$ by means of a screw adjustment (not shown), whilst the pair of reflectors $R_3$, $R_4$ are fixed in position relative to the modulating cavity $C_M$. Attached to the variable light path device VP is a scale S which is calibrated in distance units and which may have a vernier reading scale (not shown).

After having passed through the variable light path device VP athe beam $Mb_2$ from the master unit M is transmitted along the path the length of which is to be measured to a slave unit S. The beam $Mb_2$ is received by a telescope $T_S$ of the slave unit and is directed onto a reflector SR$_5$. A beam S$b_3$ from the reflector SR$_5$ is passed through a modulating cavity C$_S$ arranged, in a manner to be described, to produce further polarisation modulation of the beam S$b_3$ and including an associated oscillator producing an input frequency $f_S$, as illustrated. The frequency $f_M$ of modulation of the modulating cavity C$_M$ of the master unit is different from the frequency $f_S$ of modulation of the modulating cavity C$_S$. The frequency $f_M$, for example, may be 150MHz and the frequency $f_S$, for example, may be 149.99MHz. A beam S$b_4$ from the modulating cavity C$_S$ is directed through a plane polariser SP$_2$ onto a photo-detector PD$_S$ which may, for example, be a photo multiplier. The plane of polarisation of the plane polariser SP$_2$ is at right-angles to the plane of polarisation of the plane polariser MP$_1$ of the master unit M and, in consequence, the polarisation modulation beat frequency of the beam S$b_4$ is converted by the plane polariser SP$_2$ into an amplitude modulated beam S$b_5$ which is directed onto the photo-detector PD$_S$. In the example given above, the frequency $f_B$ of the amplitude modulation of the beam S$b_5$ will be 10KHz. It is important to note that the phase of the beam S$b_5$ is identical to the phase of the beam M$b_2$ relative to the phase $\phi_S$ of the modulating cavity C$_S$. An electrical output signal from the photo-detector PD$_S$ has a frequency which is the same as that of the modulation of the beam S$_b$5 and is used to modulate an HT generator (not shown) of a laser L$_S$ which produces a parallel light beam S$b_1$. The beam S$b_1$ is directed through a plane polariser SP$_1$ to the modulating cavity C$_S$ which produces polarisation modulation of an outgoing beam S$b_2$. The beam S$b_2$ is, therefore, amplitude modulated at the frequency $b_B$ and polarisation modulated at the frequency $f_S$. The beam S$b_2$ is transmitted back along the path the length of which is to be measured to a telescope T$_M$ of the master unit M and is directed thereby onto a reflector MR$_5$. A beam M$b_3$ from the reflector MR$_5$ is passed to the modulating cavity C$_M$.

A beam M$b_4$ from the modulating cavity C$_M$ is directed through a plane polariser MP$_2$ onto a photodetector PD$_M$ which may, for example, be a photo-multiplier. The plane of polarisation of the plane polariser MP$_2$ is at right-angles to the plane of polarisation of the plane polariser SP$_1$ of the slave unit S and, in consequence, the polarisation modulation beat frequency of the beam M$B_4$ is converted by the plane polariser MP$_2$ into an amplitude modulated beam M$b_5$ which is directed onto the photo detector PD$_M$. In the example given above, the frequency of the amplitude modulation of the beam M$b_5$ is the same as the frequency $f_B$ of the amplitude modulation of the beam S$b_5$. The phase of the beam M$b_5$ is determined by the phase of the beam M$b_3$ relative to the phase $\phi_M$ of the modulating cavity C$_M$, that is to say is related to the number of cycles of the beam S$b_2$ over the path the distance of which is to be measured. The beam S$b_2$ as mentioned previously is also amplitude modulated at a frequency $f_B$, the phase of the amplitude modulation of the beam M$b_5$ being related to the number of cycles of the beam M$b_2$ over the path the distance of which is to be measured in addition to the number of cycles of the amplitude modulation of the beam S$b_2$. If the reflectors R$_1$, R$_2$ of the variable light path device VP are altered in position, the output of the photo-detector PD$_M$ will be a minimum as cycles of the amplitude modulation of the beam M$b_5$ come into opposition. By adjusting the level of amplitude modulation of the beam S$b_2$, this minimum can be made very sharp, for example, the variable light path device VP may be located to within 1mm. The output signal from the photo-detector PD$_M$ is amplified by an amplifier A and displayed by an indicator I.

If the time taken for the beam M$b_2$ to traverse the distance to be measured is $t$, the phase of the beam S$b_4$ relative to the phase of the beam M$b_2$ at the modulating cavity C$_S$ is:

$$(\phi_M + tf_M) - \phi_S$$

the phase of the beam M$b_4$ relative to the phase of the beam S$b_2$ at the modulating cavity C$_M$ is $$\phi_M - (\phi_S + tf_S)$$

the phase delay of the amplitude modulation of the beam S$b_2$ is $$t(f_M - f_S)$$

Thus the phase of the beam M$b_4$ relative to the phase of the beam M$b_2$ at the modulating cavity C$_M$ is $$\phi_M - (\phi_S + tf_S) - (\phi_M + tf_M) + \phi_S - t(f_M - f_S) = -2tf_M$$

Thus it will be seen that as far as the phase change which occurs over the distance to be measured is concerned, the slave unit S acts as a reflecting target. The use of the slave unit S in place of a reflecting target, however, has the advantage of increasing the distance which can be measured by the distance measuring apparatus. A reflecting target behaves as a directional small source with a time fluctuating angular spectrum due to atmospheric shimmer. The energy returned by a reflecting target, will vary as the inverse fourth power of the distance to be measured whereas the energy from the slave unit S received by the master unit M varies as the inverse square of the distance to be measured. Thus the distance measuring apparatus of FIG. 1 has considerably more than double the range of an equivalent apparatus in which the slave unit S is replaced by a purely reflecting target.

The modulating cavity C$_M$ comprises (FIG. 2) a quarter-wave coaxial line cavity resonator having an outer substantially cylindrical conductor O and an inner coaxial conductor I'. The modulating cavity C$_M$ constitutes the resonator and a stable oscillator which produces an output signal having a frequency $f_M$. The output signal from the stable oscillator is fed to the modulating cavity C$_M$ by means of a coupling loop CL.

A limited range of tuning of the modulation wavelength of the modulating cavity C$_M$ is provided by means of an axially movable annular tuning plunger TP of insulating material which is disposed in the annular space between the inner and outer conductors I', O.

Figure 3:
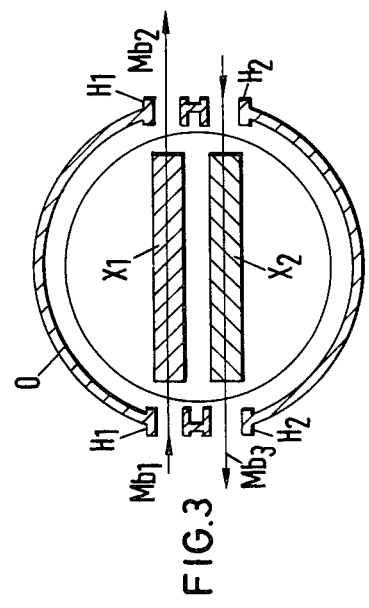
FIG. 3 is a section taken on the line 3—3 of FIG. 2.

Two sets of aligned holes H$_1$, H$_2$ (FIG. 3) are provided in the outer conductor O adjacent the higher impedance end of the modulating cavity and are disposed in a common cross-sectional plane thereof. The common axis of the respective sets of holes H$_1$, H$_2$ extend parallel to one another and substantially diametrically of the outer conductor O.

Polarisation modulation of the beam M$b_1$ is achieved by means of a crystal, for example, of ammonium dihydrogen phosphate (ADP), potassium dihydrogen phosphate (KDP), potassium dideuterium phosphate (KD$^x$P) or lithium niobate, which displays the direct Pockels linear electro-optic effect. In the embodiment shown in FIGS. 2 and 3, two identical lithium niobate crystals $X_1$, $X_2$ are mounted in the modulating cavity $C_M$. A first crystal $X_1$ is disposed in the aligned holes $H_1$ and a second crystal $X_2$ is disposed in the aligned holes $H_2$. The crystals $X_1$, $X_2$ are arranged with their z-axis perpendicular to the oscillating electric field E in the modulating cavity $C_M$ and with their x- or y-axis parallel to the plane of polarisation of the beam $Mb_1$. The crystals $X_1$, $X_2$ are also arranged with their x-axis perpendicular to each other. The beam $Mb_1$ passes through the crystal $X_1$ and beam $Mb_3$ passes through the crystal $X_2$. Each of the crystals X may have specific dimensions 12.5 by 4.0 by 2.5mm, the z-axis of each crystal being accurately parallel to the 12.5mm dimension and the x-axis and y-axis being roughly parallel to the other two dimensions.

The electric field E acting on each crystal $X_1$, $X_2$ induces eliptical polarisation of the beam passing therethrough by the direct Pockels linear optic effect. The ellipticity induced is linearly dependent on the magnitude of the applied electric field E and the length of the light path within the crystal. Thus the beam $Mb_2$ emerging from the crystal $X_1$ is polarisation modulated with a modulation wavelength dependent upon the wave length of the oscillations of the electric field in the modulating cavity. The ellipticity of the elliptical polarisation of the beam $Mb_3$ passing through the crystal $X_2$ will, in general, either be increased or decreased depending on the relative modulation phase of the beam $Mb_3$ compared with the instantaneous phase of the modulating cavity $C_M$. Thus the beam $Mb_4$ entering the polariser $MP_2$ will, therefore, be dependent on the relative modulation phase of the beams $Mb_2$ and $Mb_3$.

The applied electric field E may be several hundred volts to produce a reasonable level of modulation and since the beam $Mb_1$, $Mb_3$ originate from a laser either or both may be passed twice through the respective crystal $X_1$, $X_2$ to double the degree of ellipticity inducted therein.

Figure 2:
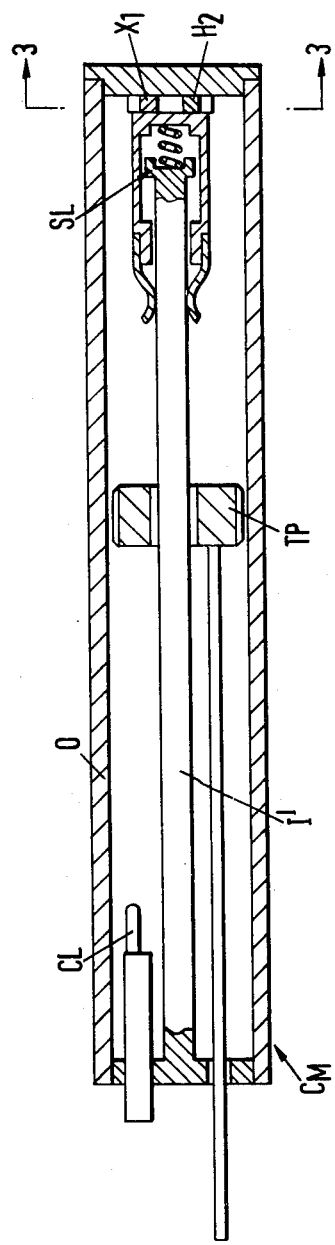
FIG. 2 is a cross-section of a modulating cavity of the distance measuring apparatus of FIG. 1.

The crystals $X_1$, $X_2$ are, as shown in FIG. 2, mounted on a spring loaded structure SL which resiliently engages the inner conductor I'. This facilitates the correct positioning of the crystals $X_1$, $X_2$ relative to the beams $Mb_1$, $Mb_3$ and the applied electric field E.

The modulating cavity $C_s$ is of identical construction to the modulating cavity $C_m$ except that it is fed with an output signal from a standard oscillator having a frequency of $f_S$.

The lasers $L_M$, $L_S$ are also identical and may, for example, be helium-neon lasers. In fact, the master unit M and the slave unit S may be of identical construction: for master operation switch means (not shown) connect the photo-detector to the amplifier A and the indicator I and for slave operation the switch means connects the photo-detector to the laser. For slave operation the reflectors $R_1$, $R_2$ of the variable light path device are fixed in position relative to the modulating cavity.

The method of making a distance measurement using the distance measuring apparatus of FIG. 1 will now be described. Firstly, the frequencies $f_M$, $f_S$ of modulation of the modulating cavities $C_M$, $C_S$, respectively, are set so that the half-wavelength of the modulation is fairly accurately 1m, these frequencies each being approximately 150 MHz. The exact half wavelength is determined from a knowledge of the speed of light in vacuo, the frequencies $f_M$, $f_S$ and measurements of atomospheric refractive index at convenient points along the path the distance of which is to be measured, the refractive index being determined from barometric pressure and temperature readings. The variable light path device VP is then adjusted until a minimum is indicated by the indicator I to give the fraction of a meter of the distance being measured.

The frequencies of modulation of the modulating cavities $C_M$, $C_S$, respectively, are then increased by 10% and the variable light path device VP is then adjusted until a minimum is indicated by the indicator I, to give the units of meters of the distance being measured. The frequencies of modulation of the modulating cavities $C_M$, $C_S$, respectively, are then increased by 1% instead of by 10%, and the variable light path device VP is then adjusted again until a minimum is indicated by the indicator I to give the tens of meters of the distance being measured. This process is repeated to provide all significant figures of the distance being measured.

It will be appreciated that the variable light path device VP may be dispensed with, and instead, the frequencies $f_M$, $f_S$ of modulation of the modulating cavities $C_m$, $C_S$, respectively, could be adjusted until a minimum is indicated by the indicator I. This will be repeated for a set of frequency ranges.

It has so far been assumed that the light beams are monochromatic and as a result it is necessary to determine the refractive index of air at various points along the path the length of which is to be measured in order to arrive at a value for the modulation half wavelength. However, if light of two or more colours is used, the differences is phase between the colours at the same frequency of modulation can be used to assess the atmospheric correction to be made. Since the total atmospheric correction in most cases is only 300 ppm, the differences in phase between the colours must be measured very accurately. To apply this principle the apparatus of FIG. 1, in one arrangement, is modified so that the master unit M produces a beam $Mb_2$ consisting of two colours of light geometrically superimposed and alternating in time, for example, at a frequency of 100Hz. the light being produced by two separate lasers. The slave unit S transmits the phase information received from the master unit M as intensity modulation of a beam $Sb_2$ of either a single colour of light or two colours of light again geometrically superimposed and alternating in time. The master unit M has a variable light path device VP, a photo-detector $PD_M$, an amplifier A and a indicator I for each colour of light. It will be appreciated that it is not essential to return the phase information received by the slave unit S to the master unit M. The phase difference for the two colours may be measured at the slave unit S by means of a variable light path device or indeed by any conventional electronic phase comparison circuitry.

Instead of amplitude modulating the beams $Sb_2$, with the phase information received by the slave unit S from the master unit M, the output of the photo detector $PD_S$ could be used either to amplitude modulate the output of the standard oscillator driving the modulating cavity $C_S$, or to polarisation modulate the beam $SB_2$ by applying it to the crystal $X_2$ of the modulating cavity $C_S$. Alternatively the phase information received from the slave unit S could be returned to the master unit M using a separate low frequency light modulation or a microwave link.

Figure 4:
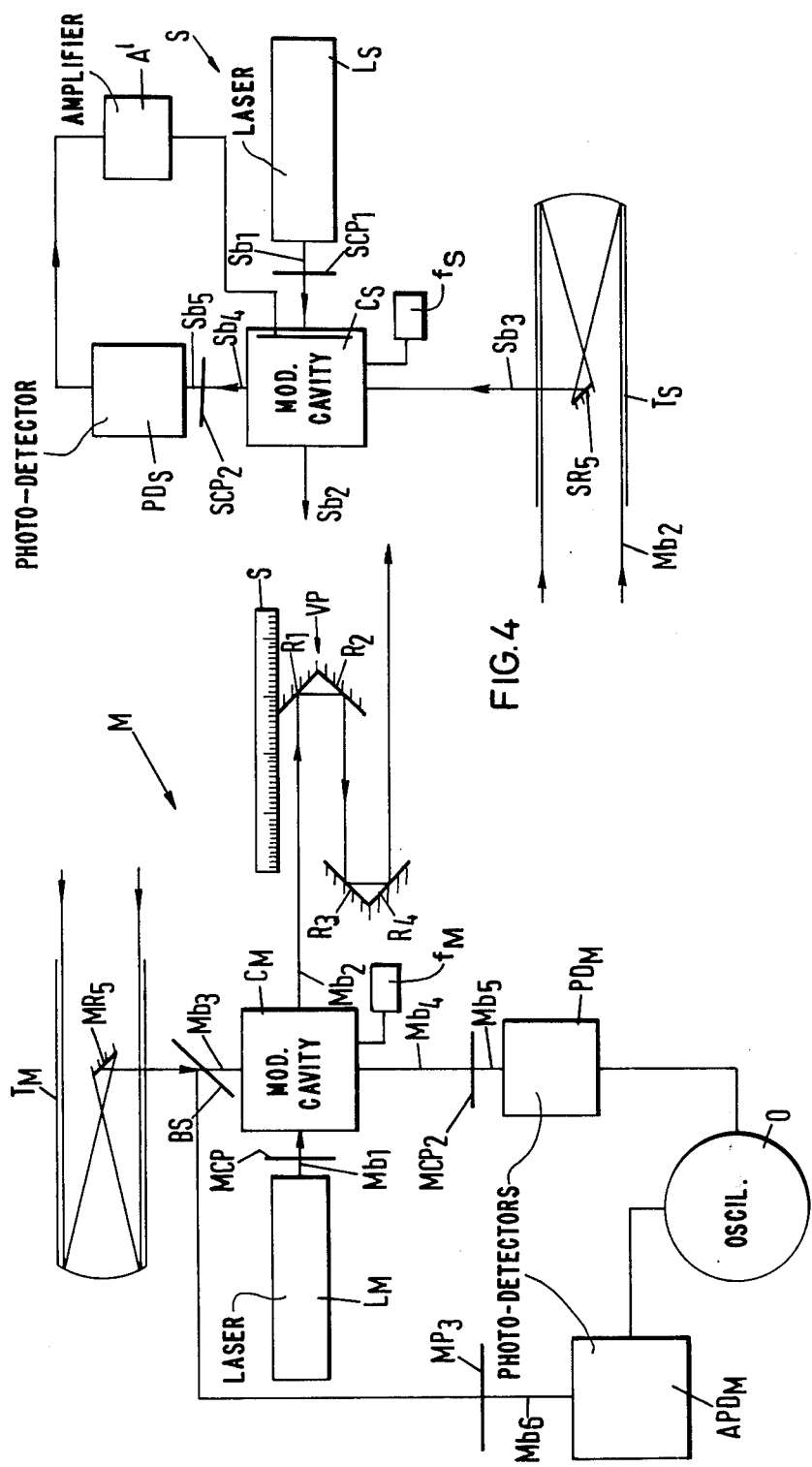
FIG. 4 is a schematic diagram illustrating a modification of the distance measuring apparatus of FIG. 1.

A modification of the distance measuring apparatus of FIG. 1 is illustrated in FIG. 4. Like parts in FIGS. 1 and 4 have been designated by the same reference numerals.

In the distance measuring apparatus of FIG. 4, a circular polariser $MCP_1$ is disposed between the laser $L_M$ and the modulating cavity $C_M$ of the master unit M in place of the plane polariser $MP_1$ of the distance measuring apparatus of FIG. 1. Thus the beam $Mb_2$ from the modulating cavity $C_M$ is elliptically polarisation modulated at the frequency $f_m$ of the cavity $C_M$. Similarly a circular polariser $SCP_2$ is disposed between the modulating cavity $C_S$ and the photo-detector $PD_S$ of the slave unit S in place of the plane polariser $SP_2$ of the distance measuring apparatus of FIG. 1. The circular polariser $SCP_2$ is crossed with respect to the circular polariser $MCP_1$. Thus the beam $Sb_2$ is amplitude modulated at the frequency $f_B$. The electrical output of the photo-detector $PD_S$ has a frequency which is the same as that of the beam $Sb_5$ and is amplified by an amplifier A', the amplified signal being applied to an additional electrode (not shown) in the modulating cavity $C_S$. The beam $Sb_1$ from the laser $L_S$ is directed through a circular polariser $SCP_1$ to the modulating cavity $C_S$. The beam $Sb_2$ from the modulating cavity is, therefore, both polarisation modulated at the frequency $f_S$ but also elliptically polarisation modulated at the frequency $f_B$.

After having been transmitted back along the path the length of which is to be measured to the telescope $T_M$ of the master unit M, the beam $Mb_3$ is directed onto a beam splitter BS. The part of the beam passing through the beam splitter is directed through the modulating cavity $C_M$. The beam $Mb_4$ from the modulating cavity $C_M$ passes through a circular polariser $MCP_2$ which is crossed with respect to the circular polariser $SCP_1$. The beam $Mb_5$ emerging from the circular polariser $MCP_2$ is amplitude modulated and is directed onto the photo-detector $PD_M$. The frequency of the amplitude modulation of the beam $Mb_5$ is $f_B$ and its phase is related to the phase $\phi_M$ of the modulating cavity $C_M$, that is to say related to the number of cycles of the beam $Sb_2$ over the path the distance of which is to be measured.

The part of the beam deflected by the beam splitter BS passes through a plane polariser $MP_3$, and a beam $Mb_6$ emerging therefrom is amplitude modulated at the frequency $f_B$ and its phase is related to the phase $\phi_S$ of the modulating cavity $C_S$ that is to say related to the number of cycles of the beam $Mb_2$ in the path between the modulating cavity $C_M$ and the modulating cavity $C_S$ including the variable light path device VP. The beam $Mb_6$ is directed onto a photo-detector $APD_M$. The output signal of the photo-detector $PD_M$ is applied to the X-plate of an oscilloscope O and the output signal from the photo-detector $APD_M$ is applied to the Y-plate of the oscilloscope. The output signals from the photo-detectors $PD_M$, $APD_M$ causes the oscilloscope to display a Lissajous figure which is adjusted to become a line by variation of the variable light path device VP from which the length of the path to be measured may be determined in the manner described in relation to FIG. 1.

We claim:

1. A distance measuring apparatus comprising: a first unit comprising a first modulating means for polarization modulating at a first high frequency a first optical beam carrier radiation and a first transmitting means for transmitting the first optical carrier radiation over a path the length of which is to be measured; and a second unit comprising receiving means for receiving the polarization modulated first optical radiation after said first modulated light has traversed the path the length of which is to be measured, a second modulating means for polarization modulating at a second high frequency a second optical beam carrier radiation, means for supplying the received first optical radiation to said second modulating means so as to produce a low down-converted frequency corresponding to the difference between the first high frequency modulation and the second high frequency modulation, a further modulating means for modulating said second optical carrier radiation at the low down-converted frequency corresponding to the difference between the first high frequency modulation and second high frequency modulation to produce separate modulation of said second optical carrier radiation, and second transmitting means for transmitting the combined low frequency and high frequency modulated second optical carrier radiation to the first unit over the path the length of which is to be measured, said first unit further comprising means for supplying the received modulated second optical carrier radiation to said first modulating means so as to provide frequency down-conversion thereof, detecting means for detecting the polarization modulation phase of the second optical carrier after frequency down-conversion by said first modulating means and means for providing an indication of the length of the path based on said polarization modulation phase.

2. An apparatus as claimed in claim 1 in which said first modulating means comprises a crystal which exhibits the direct Pockels linear electro-optic effect and which is arranged in a cavity resonator for transmission therethrough, in a direction parallel to its z-axis, of the first optical carrier radiation, the x- or y-axis of the crystal being parallel to the plane of polarisation of the first optical carrier radiation passing therethrough.

3. An apparatus as claimed in claim 2 in which the detecting means comprises a crystal which exhibits the direct Pockels linear electro-optic effect and which is arranged in the cavity resonator for transmission therethrough, in a direction parallel to its optic axis of the received modulated second optical carrier radiation and perpendicular to an applied electric field, the apparatus further including means for changing the modulation wavelength and/or the path traversed by the modulated first optical carrier radiation so as to permit measurement of the path in terms of the modulation wavelength.

4. An apparatus as claimed in claim 3 in which the z-axis of each crystal is perpendicular to the electric field at the respective crystal.

5. An apparatus as claimed in claim 1 including a first laser for producing the first optical carrier radiation.

6. An apparatus as claimed in claim 1 in which said second modulating means comprises a crystal which exhibits the direct Pockels linear electro-optic effect and which is arranged in a cavity resonator for transmission therethrough, in a direction parallel to its z-axis of the second optical carrier radiation, the x- or y-axis of the crystal being parallel to the plane of polarisation of the second optical carrier radiation passing therethrough.

7. An apparatus as claimed in claim 6 in which the receiving means includes a crystal which exhibits the direct Pockels linear electro-optic effect and which is arranged in the cavity resonator for transmission therethrough, in a direction parallel to its optic axis of the received modulated first optical carrier radiation.

8. An apparatus as claimed in claim 7 in which the z-axis of each crystal is perpendicular to the electric field at the respective crystal.

9. An apparatus as claimed in claim 1 including a laser for producing the second optical carrier radiation.

10. An apparatus as claimed in claim 9 in which the laser is arranged to be controlled by the said further modulating electrical means.

* * * * *